Figure 1:
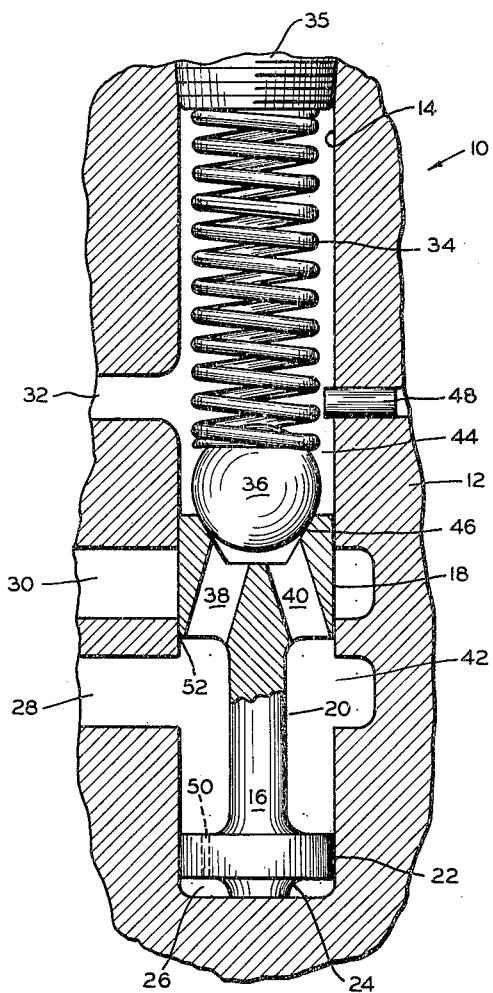

Nov. 7, 1961   B. L. FROST   3,007,481
PRESSURE REGULATOR
Filed Dec. 30, 1959

INVENTOR.
BARRY L. FROST
BY Kenneth C. Witt
ATTORNEY

3,007,481
PRESSURE REGULATOR
Barry L. Frost, Jackson, Mich., assignor to Clark Equipment Company, a corporation of Michigan
Filed Dec. 30, 1959, Ser. No. 862,817
3 Claims. (Cl. 137—116)

This invention relates to pressure regulators and more particularly to pressure regulating valves of the kind which operate automatically to release fluid when the fluid pressure attains a predetermined value.

One type of pressure regulating valve known heretofore employs a slide or spool member operable in a chamber in the regulator housing. An inlet opening admits fluid to the chamber and means are provided for applying the pressure of the incoming fluid to exert an axial force on one end of the slide. A spring in the chamber opposes movement of the slide under the influence of the fluid pressure and restores the slide to its initial position in the absence of fluid pressure. An outlet is provided from the chamber and the slide is so arranged that upon predetermined movement of the slide in the chamber fluid is discharged through such outlet to maintain the desired pressure.

A disadvantage of such prior regulating valve structures is that the presence of dirt or other foreign material in the mechanism may cause the slide to stick or otherwise malfunction.

The object of the present invention is to provide a construction for such pressure regulators which overcomes this disadvantage.

In carrying out my invention in one form, I provide a passageway through the end of the slide upon which the return spring acts. A ball or sphere is located between the spring and the slide. This ball normally seals the passageway and allows the pressure regulator to operate in a normal manner until it sticks or for any other reason the pressure becomes excessive. In such case, at a predetermined pressure, the ball leaves its seat and allows the discharge of fluid through the passageway in the slide. The ball provides a rattling or vibrating operation which tends to free the slide.

A feature of my invention is that in addition to operating to free the slide, it also relieves excessive pressure in the pressure regulator and thus, in effect, functions also as a relief valve.

For a clearer and more complete understanding of my invention reference should be had to the accompanying drawing, the single figure of which is a fragmentary view partially in section of a pressure regulator embodying my invention in a preferred form.

In the drawing the pressure regulator has been indicated generally by the numeral 10. The regulator includes a housing portion 12 having a cylindrical bore or chamber extending into the housing from the top. A spool or slide member 16 is located in the chamber 14. Slide 16 has an upper land portion 18 which fits very snugly in the chamber 14, an intermediate necked down or smaller diameter portion 20, a lower land portion 22 which also fits very snugly in the chamber 14, and a projection 24 at the lower end which forms a space 26 between the bottom of the chamber and land portion 22.

An inlet opening through the housing into the chamber 14 is indicated at 28, an outlet opening at 30 and a drain opening at 32.

Also included in the pressure regulator valve is a spring 34 which biases the slide 16 downwardly and a ball or sphere 36 interposed between the spring and slide. A plug 35 closes the top of chamber 14 and provides the reaction point for spring 34.

The upper land portion 18 of the slide includes two passageways 38 and 40 which provide communication between the space 42 around the intermediate portion 20 of the slide and space 44 above the slide when ball member 36 is off its seat, as explained hereinafter. The upper part of land portion 18 of the slide is provided with a conical seat 46 to receive the sphere 36 and provide a seal between the sphere and slide 16 during normal operation. A pin 48 projecting into the space 44 is provided to prevent movement of slide 16 beyond a predetermined desired maximum position as explained hereinafter.

During operation fluid enters the space 42 through conduit 28 and from space 42 flows through a small drilled opening 50 into space 26. Opening 50 preferably is made small to provide a dampening action on axial movements of the slide 16. When fluid reaches chamber 26 the pressure thereof exerts an axial force on slide 16 to move it upwardly, compressing spring 34. When the corner 52 of land portion 18 uncovers outlet port 30 fluid is discharged from space 42 through the outlet port. Such action provides for automatically discharging of fluid to maintain the fluid pressure in space 42 at the desired value which is determined by the characteristic of spring 34. During normal operation slide 16 uncovers port 30 a greater or lesser amount as necessary to maintain the desired pressure, and in the absence of fluid pressure in chambers 42 and 26 resulting from pressurized fluid delivered through inlet 28, slide 16 returns to the quiescent position illustrated in the drawing.

As mentioned previously, however, it has been found that in some regulating valve mechanisms of this type the slide sticks because of the presence of dirt or other foreign matter in the hydraulic system which gets into the regulating valve. This may cause the regulator not to discharge the required amount of fluid with the result that pressure builds up in space 42. In the event of such an occurrence with the present pressure regulator, the sphere 36 leaves its seat 46 at a predetermined pressure in excess of the normal regulating pressure and provides for the discharge of the fluid through passageways 38 and 40 to space 44 and from there out through the drain 32. Pin 48 acts as a stop to prevent slide 16 from moving upwardly far enough to cut off drain 32.

It is a known characteristic of ball check valves that they tend to rattle or vibrate, and my invention utilizes this characteristic to provide a hammering action on the slide to free it if it is stuck. Apparently such rattling action of a ball check valve is produced by the action of the spring attempting to return the ball to its seat as soon as a spurt of fluid has been ejected. Then the ball moves outwardly again to allow the ejection of an additional spurt of fluid. Such action continues, producing the rattling effect. The ball portion of the present mechanism operates similarly to a ball check valve.

My invention also provides the effect of a relief valve to dissipate any excessive pressure which may build up in space 42; thus even if the slide 16 should remain stuck excessive pressure will not build up in space 42 and perhaps damage fluid devices connected thereto.

Thus my invention provides a construction for a regulating valve which is less susceptible to sticking and malfunction than previous mechanisms of this type and additionally it provides means for relieving excess pressure in the event that malfunction does occur.

While I have described and illustrated my invention in one preferred form thereof, it will be appreciated by those skilled in the art that modifications may be made. Accordingly it should be understood that I intend to cover by the appended claims all such modifications falling within the true spirit and scope of my invention.

I claim:
1. A fluid pressure regulator comprising a housing hav- ing an elongated chamber therein, a slide operable in the said chamber, means for admitting fluid to the said chamber, means responsive to the pressure of such fluid for exerting a force on and moving the said slide, a stop pin projecting from the wall of said chamber for providing a predetermined limit to such movement of the said slide, restoring means for exerting a force on the said slide in opposition to the said pressure responsive force, means for discharging fluid from the said chamber responsively to a predetermined fluid pressure responsive force on the said slide, and additional means including a passageway through the said slide and a displaceable member disposed between said slide and said restoring means and normally blocking the said passageway for discharging fluid from the chamber upon the occurrence of a predetermined greater fluid pressure responsive force on the said slide.

2. A fluid pressure regulator comprising a housing having an elongated chamber therein, a slide operable in the said chamber, means for admitting fluid to the said chamber, means responsive to the pressure of such fluid for exerting a force on and moving the said slide, restoring means acting upon the said slide in opposition to such force, means for discharging fluid from the said chamber responsively to a predetermined force on the said slide, additional means including a passageway through the said slide and a displaceable member disposed between the slide and said restoring means and normally blocking the said passageway for discharging fluid from the chamber upon occurrence of a predetermined greater force on the said slide, and means for limiting the movement of said slide in one direction without limiting the movement of said displaceable member in the said one direction.

3. A fluid pressure regulator comprising a housing having an elongated cylindrical chamber therein, an elongated spool member arranged for reciprocal movement in the said chamber, the said spool member having a radially projecting land portion adjacent each end and an intermediate smaller diameter portion forming a space with the walls of the said chamber, an inlet opening through the said housing for admitting fluid to the said space, one of the said land portions having an opening therethrough for admitting fluid from the said space to one end of the said spool member for exerting an axial force thereon proportional to the pressure of the said fluid, a compression spring in the said chamber arranged to exert a force on the opposite end of the said spool member adjacent the other said land portion in opposition to the said fluid pressure produced force, an outlet opening in the said housing for discharging fluid from the said space responsively to a predetermined fluid pressure produced force on the said spool member, the said outlet opening being covered by the said other land portion in the absence of fluid pressure but uncovered a varying amount during pressure regulating operation as a result of compression of the said spring and movement of the said spool member to discharge enough fluid to maintain the fluid pressure in the said space at a desired value, the said other land portion adjacent the said spring including a passageway therethrough providing communication between the said space and the space in the said chamber occupied by the spring, a displaceable sphere located between the spring and the said spool member, a seat on the end of the said spool member for receiving the said sphere and in which said passageway ends whereby the sphere blocks the said passageway during normal operation, and means for limiting the movement of said spool member in the direction towards said spring, the aforementioned parts being so constructed and arranged that upon the occurrence of a predetermined abnormal pressure in the first said space the said sphere leaves the said seat and allows the discharge of fluid through the said passageway from the said first space to the said occupied by the said spring.

References Cited in the file of this patent
UNITED STATES PATENTS
2,633,148     Kelly _____ Mar. 31, 1953

UNITED STATES PATENT OFFICE
CERTIFICATE OF CORRECTION

Patent No. 3,007,481                            November 7, 1961

Barry L. Frost

It is hereby certified that error appears in the above numbered patent requiring correction and that the said Letters Patent should read as corrected below.

Column 4, line 34, after "said", first occurrence, insert -- space --.

Signed and sealed this 10th day of April 1962.

(SEAL)
Attest:

ERNEST W. SWIDER                                    DAVID L. LADD
Attesting Officer                                      Commissioner of Patents